Dec. 23, 1924.
L. H. THOEN
PICK-UP ATTACHMENT FOR HARVESTERS
Filed Oct. 27, 1919    2 Sheets-Sheet 2
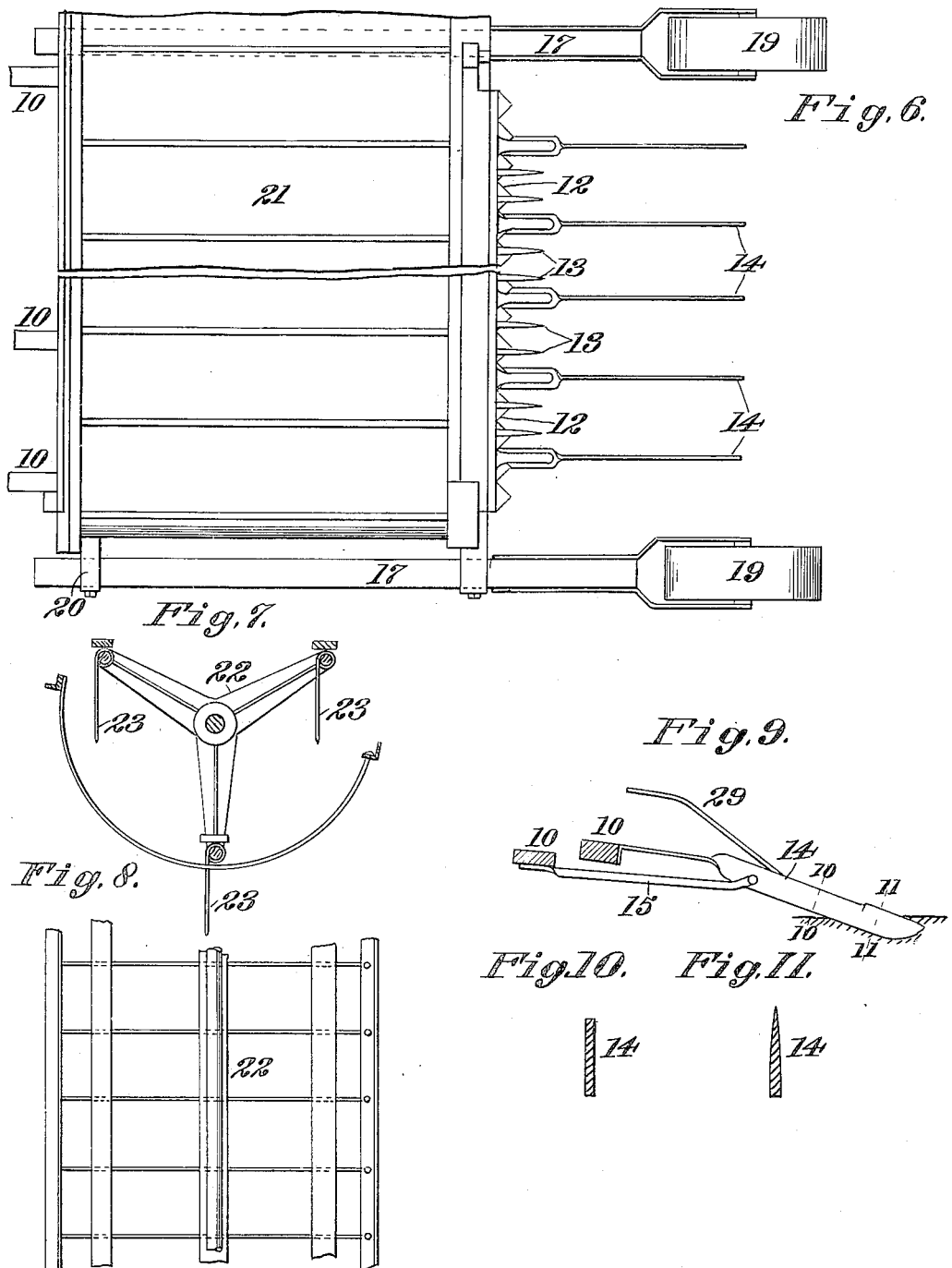
INVENTOR
Lowell H. Thoen
BY Strong & Townsend
ATTORNEYS Patented Dec. 23, 1924.

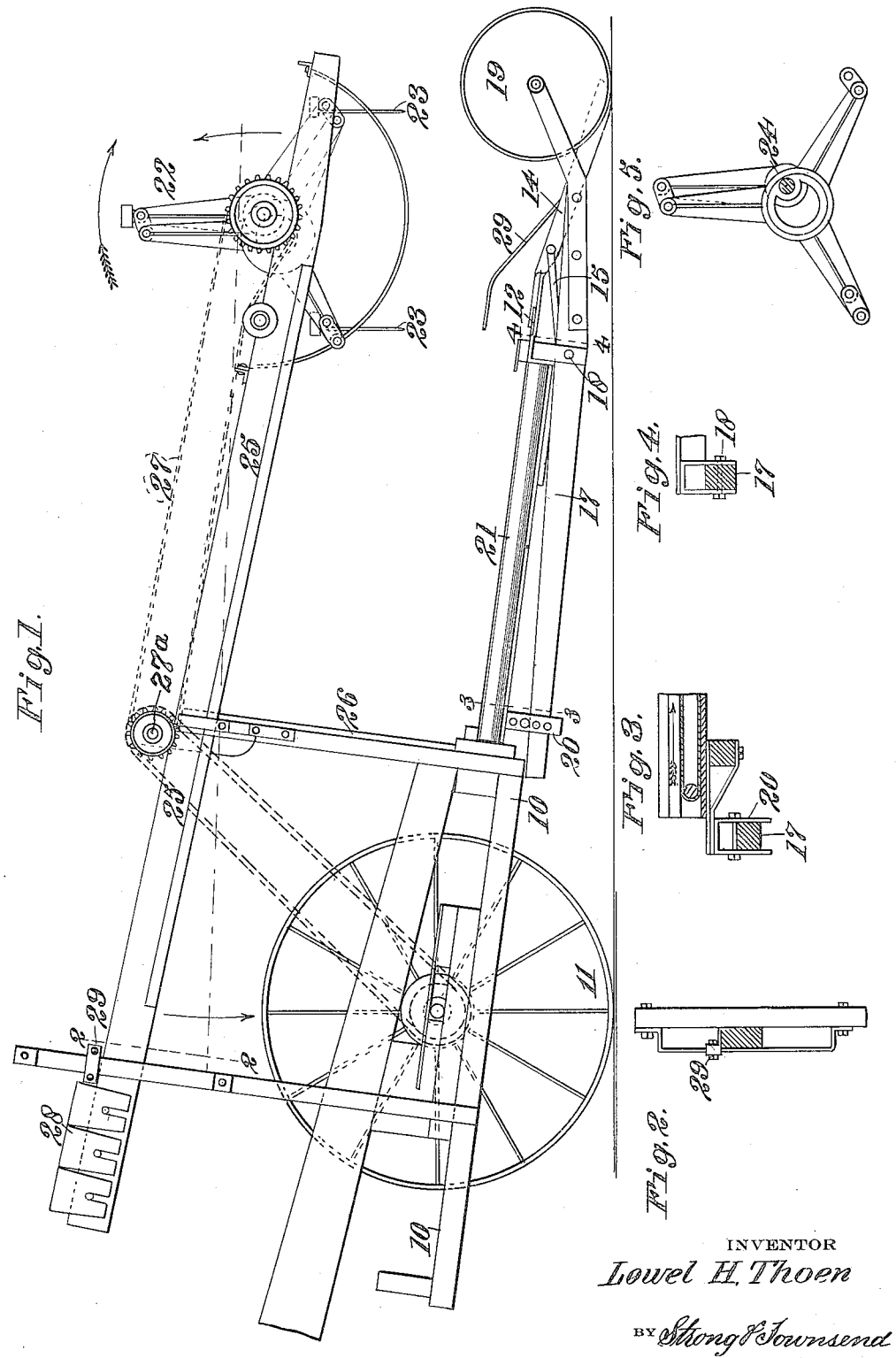

1,520,456

UNITED STATES PATENT OFFICE.

LOWELL HALVERSON THOEN, OF STOCKTON, CALIFORNIA, ASSIGNOR TO THE HOLT MANUFACTURING COMPANY, OF STOCKTON, CALIFORNIA, A CORPORATION OF CALIFORNIA.

PICK-UP ATTACHMENT FOR HARVESTERS.

Application filed October 27, 1919. Serial No. 333,521.

*To all whom it may concern:*

Be it known that I, LOWELL HALVERSON THOEN, a citizen of the United States, residing at Stockton, in the county of San Joaquin and State of California, have invented new and useful Improvements in Pick-Up Attachments for Harvesters, of which the following is a specification.

This invention relates to harvesters, and more especially to a pick-up attachment for use in conditions where the grain or stalks of beans or other product to be harvested are lying close to the ground.

It is extremely desirable in any situation where grain is lying close to the ground to provide an attachment for the front of the reaper or header which will pick up the downlying and tangled stalks and guide them into the cutting mechanism or on to the traveling apron. Also as a means of threshing which is well suited for beans and similar vegetables and may also be applied to the threshing of wheat and other like grains, it is desirable to first cut the grain or other product with an ordinary mower, header or reaper, and allow the stalks to lie on the ground in swaths whereby to become cured or ripened. Then when it is ready for threshing a combined harvester including a header with pick-up attachment may be operated over the field to pick-up the grain lying in swaths and thresh it. The cutter bar of the header while not acting to cut any standing grain, should preferably be allowed to operate in order to sever loose stalks that tend to lodge between the fingers of the knife guard.

In the present invention, I provide the finger bar of the header with a series of extensions which incline forwardly and downwardly into close proximity with the ground whereby to pass beneath the downlying grain and guide it into the cutting mechanism. Also I fit the header frame with gauge wheels whereby to control the elevation of the forwardly and downwardly extending guide members. For situations where the grain is already cut and lying in swaths on the ground, I mount a rotary reel above the guide members, this reel being preferably provided with retractile teeth whereby the grain as it bunches up on the guide members will be positively moved in the desired direction on to the traveling apron.

One form which my invention may assume is exemplified in the following description and illustrated in the accompanying drawings wherein:

Fig. 1 shows a side elevation of a header mechanism fitted with my pick-up attachment.

Fig. 2 is a detailed sectional view taken on line 2—2 of Fig. 1.

Fig. 3 is a detailed sectional view taken on the line 3—3 of Fig. 1.

Fig. 4 is a detailed sectional view taken on the line 4—4 of Fig. 1.

Fig. 5 shows a detailed view of the eccentric mechanism for controlling the teeth of the rotary reel.

Fig. 6 shows a portion of the header frame in plan.

Fig. 7 shows a cross-section of the rotary reel.

Fig. 8 shows a partial plan view of the same.

Fig. 9 shows a view in elevation of one of the guide members of the pick-up attachment.

Figs. 10 and 11 are cross-sections taken on correspondingly numbered lines of Fig. 9.

10 represents the header portion of a combined harvester. The frame of the header is supported at its outer end by grain wheel 11 and carries the usual cutter bar 12 and finger bar 13 at its front side. Projecting forwardly and downwardly from the finger bar are a series of guide members 14 in the form of knives, the cross-sectional shape of which is shown in Figs. 10 and 11. These guide members are spaced apart any desired distance, but preferably about the distance between three ordinary guard fingers. They are braced each by a bar 15 connected to the underside of the header frame. The header frame has at each end a lever 17 fulcrumed at 18 and carrying at its forward end a gauge wheel 19. Adjustment of the gauge wheel is accomplished by a pin fitting into openings in a plate 20 at the rear end of the lever.

The mechanism thus far described will be effective to handle grain or vegetables which have been knocked down by storms or through other causes. The gauge wheels are set so that the guide members will be in contact with the ground and pass beneath the down-lying grain, thereby straightening it up and guiding it into the cutter mechanism. The knife edge formed on the forward end of each guide member will permit the guides to pass through the earth should any small mounds or irregularities be encountered.

For situations where the grain is already cut and lying in swaths on the ground, it is desirable to provide means to co-operate with these guide members which will be effective to positively throw the bunched up grain on to the traveling apron 21 of the header. This is provided for in the form of a rotary reel 22 fitted with retractile teeth 23 controlled by eccentric mechanism 24 after the manner of a side delivery rake. This reel is mounted on a pair of arms 25, which arms are pivotally supported on the standards 26. Suitable drive mechanism 27 is provided for the reel. The driving mechanism as here shown comprises preferably a chain 27 driven from a countershaft 27ª, which, in turn, is operatively connected to the wheel 11. The rear ends of the arms 25 are counter-balanced by means of weights 28, so that the reel will be carried in a floating manner which will permit it to ride on top of any accumulation of grain whereby to prevent jamming or clogging of the mechanism. Also in connection with the reel, I prefer to fit each guide member 14 with a supplemental member 29 which projects upwardly and rearwardly from about the middle portion of the main guide member. These supplemental members will lift the grain above the cutting mechanism of the header and allow the rotary reel to act thereon. When the header is operated over the field in a direction to cause the guide members to pick up the grain lying in swaths, it is preferable to permit the cutter bar of the header to operate in order to sever any stalks of grain which might fall between the guide bars and become lodged between the fingers of the cutting mechanism.

Various changes in the construction and arrangement of the several parts herein shown and described may be employed without departing from the spirit of my invention as disclosed in the appended claims.

The weights 28 are so adjusted that the reel overbalances them and, therefore, normally is depressed. The downward movement of the reel is limited by an adjustable stop 29ª.

The cutter bar 12 and apron 21 are preferably driven in the same manner as shown, for example, in United States Letters Patent No. 596,446, issued December 28th, 1897 to Benjamin Holt.

Having thus described my invention, what I claim and desire to secure by Letters Patent is:

1. In a harvester a grain receiving platform, inclined guide bars projecting from the front of the platform at intervals between the ends thereof and lying in close proximity to the ground, a rotary reel overlying the guide bars, retractile teeth on said reel and supporting arms for said reel pivotally and adjustably mounted on the harvester platform.

2. In a harvester a grain receiving platform, guide bars projecting from the front of the platform and lying in close proximity to the ground, arms projecting from the front of the platform and gauge wheels mounted on said arms in line with the termini of the guide bars.

3. In a harvester a grain receiving platform, inclined guide bars projecting from the front of the platform said guide bars being formed of flat metal bars twisted so that their outer ends lie in a vertical plane and their inner ends lie in a horizontal plane.

In testimony whereof I have hereunto set my hand in the presence of two subscribing witnesses.

LOWELL HALVERSON THOEN.
Witnesses:
   JAMES F. GRIFFIN,
   FRANK H. CHISHOLM.